Feb. 27, 1968     W. STELZER     3,371,173
PRESSURE FAILURE INDICATING DEVICE FOR BRAKE SYSTEMS
Filed July 28, 1966
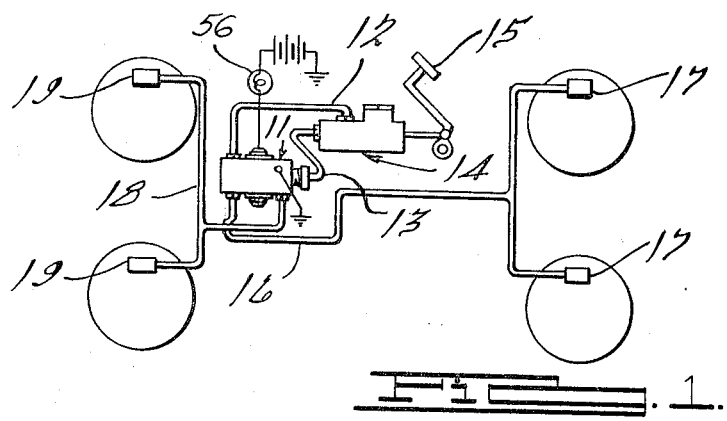
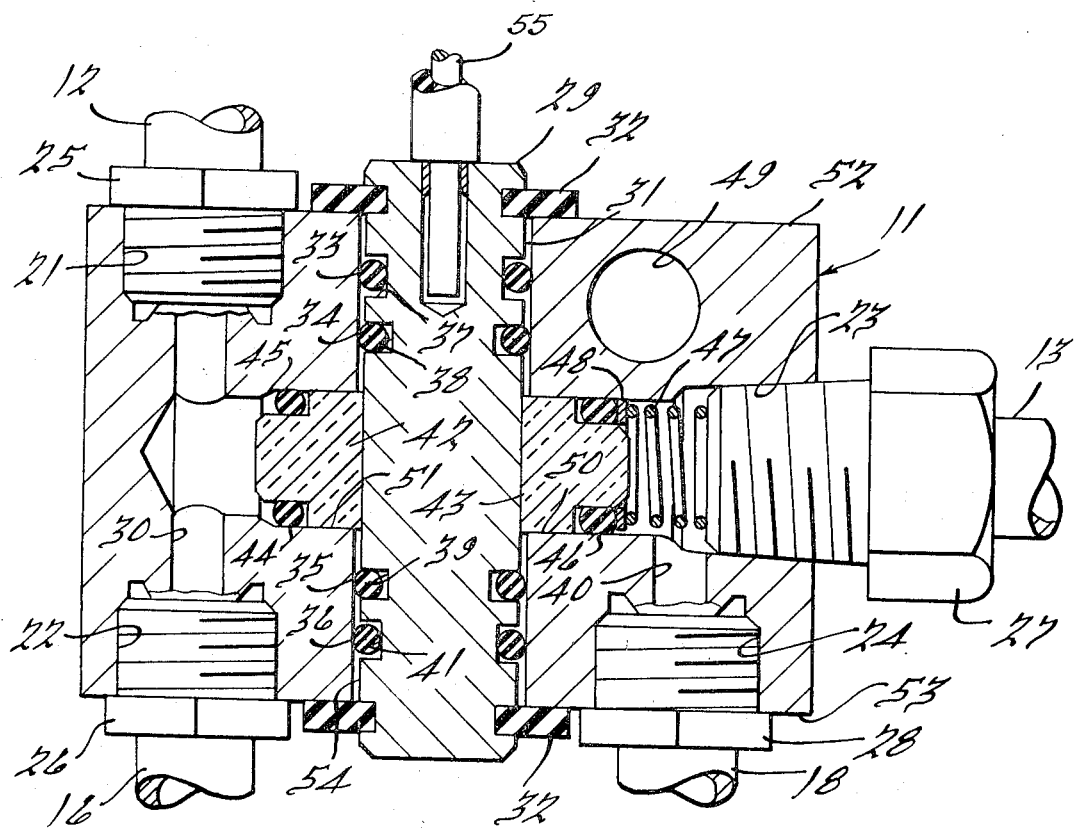
INVENTOR.
William Stelzer.
BY
Harness, Dickey & Pierce
ATTORNEYS.

United States Patent Office 3,371,173
Patented Feb. 27, 1968

3,371,173
PRESSURE FAILURE INDICATING DEVICE FOR BRAKE SYSTEMS
William Stelzer, Bloomfield Hills, Mich., assignor to Kelsey-Hayes Company, Romulus, Mich., a corporation of Delaware
Filed July 28, 1966, Ser. No. 568,655
7 Claims. (Cl. 200—82)

ABSTRACT OF THE DISCLOSURE

The device of the present invention completes a circuit to a signal when the differential in pressure between the fluid in the front and rear brake system reaches a predetermined amount. The driver of the vehicle will be notified of the pressure failure in one of the systems by the signal.

---

It is possible for the operator of an automobile or like vehicle, having a dual hydraulic brake system, to be unaware of a pressure failure in one portion of said system because the other portion will continue to bring about the desired braking action, as is well established in the art. The present invention seeks to provide indication of such failure by means of a pressure-sensitive switch which electrically actuates a light, buzzer or similar warning means.

The device of the present invention conveniently employs a housing which is connected to two lines from the master cylinder of a dual hydraulic brake system and conducts brake fluid through separate passages therein to lines separately connected to the front and rear brakes. The housing has a bore or chamber positioned between the separate passages and a cylindrical metal plug is positioned in this chamber. Rubber retaining rings are used to support the metal plug so that it is not in electrical contact with the housing. The plug is perpendicularly engaged on opposite sides thereof by two pistons made of non-conductive material. Each piston is subject to the pressure of brake fluid in one of the housing passages. A current-bearing wire from a power source is conductively secured to one end of the metal plug, and the housing is grounded at the point of its attachment to a vehicle. When the plug contacts the wall of the housing chamber in which it is located, a circuit is completed through an electrical warning means, such as a dash mounted light. When the brake system is operating properly, however, the hydraulic fluid will exert equal pressures on the opposed pistons and the metal plug will remain centered in its chamber. If the hydraulic pressure should fail in either of the front or rear brake systems, the piston of the failing system will yield to the piston of the intact system, allowing the latter piston to compress the rubber rings and displace the metal plug against the wall of its chamber and thereby activate the warning means.

Accordingly, the main objects of the invention are: to provide warning of a pressure failure in either portion of a dual hydraulic brake system by means of a pressure-sensitive switch which electrically activates a warning means; to provide a grounded metal housing within which a current-conducting plug is held out of electrical contact with the housing until displaced against the housing by either of two non-conductive opposed pistons which will exert unequal force on opposite sides of the plug when a loss of pressure takes place in one system, and in general to provide a pressure failure indicating device for dual hydraulic brake systems which is simple in construction, positive in operation and economical of manufacture.

Other objects and features of novelty of the invention will be specifically pointed out or will become apparent when referring, for a better understanding of the invention, to the following description taken in conjunction with the following drawings, wherein:

FIGURE 1 is a schematic diagram showing the relationship of the device of the present invention with the hydraulic and electrical systems of a vehicle, and FIG. 2 is an enlarged sectional view of the device of the present invention as shown in FIG. 1.

In FIGURE 1 a metal housing 11 is illustrated as forming a part of the hydraulic circuitry of a dual hydraulic brake system and is connected to hydraulic lines 12 and 13 leading from a master cylinder 14. The master cylinder 14 is operated by the use of a foot pedal 15. The housing 11 transmits brake fluid received from the line 12 to a brake line 16 leading to rear brakes 17. The housing 11 separately transmits brake fluid from the line 13 to a brake line 18 leading to front brakes 19. The rear brake system lines 12 and 16 are connected to housing inlet and outlet ports 21 and 22, respectively. Communication between the ports 21 and 22 is provided by a housing passage 30. The front brake system lines 13 and 18 are connected to housing inlet and outlet ports 23 and 24, respectively. Communication between the ports 23 and 24 is provided by a housing passage 40. The hydraulic lines 12, 13, 16 and 18 are secured to the housing 11 by means of threaded tube fittings 25, 26, 27, 28 which are mated with the inlet and outlet ports 21, 22, 23, 24, respectively. It will be seen that the inlet and outlet ports 21 and 22 and the passage 30 are all parallel to one another. The inlet port 24 and the passage 40 are also parallel to the inlet ports 21 and 22. It will be seen, however, that the inlet port 23 is disposed perpendicular to the foregoing ports and passages. The port 23 thus leaves room for a mounting hole 49 which is formed in the housing 11 and also provides access for tooling to machine a pair of coaxial bores 50 and 51 in the housing 11 perpendicular to the passages 30 and 40.

The housing 11 is formed with a bore or chamber 31 extending entirely therethrough and arranged perpendicular to and between the bores 50 and 51. The bore 31 is located intermediate the passages 30 and 40 and receives a metal plug or rod 29. The plug 29 projects from opposite end walls 52 and 53 of the housing 11 and is provided with grooves on its outer periphery for the reception of retaining washers 32 of an elastomeric material. The washers 32 engage the end walls 52 and 53 of the housing to prevent substantial movement of the plug axially of the bore 31. The plug 29 is of a substantially cylindrical configuration and has a diameter less than the diameter of the bore 31. The plug 29 is supported within the bore 31 by a pair of annular O-rings 33 and 36 of elastomeric material which are received within annular grooves 37 and 41 machined in the outer periphery 54 of the plug 29. The rings 33 and 36 serve to space the periphery 54 of the plug 29 radially inwardly of the wall of the bore 31. By this means an annular clearance space normally exists between the wall of the bore 31 and the outer periphery 54 of the plug 29. It will be seen that the grooves 37 and 41 are located at substantially the opposite ends of the plug 29. A second pair of grooves 38 and 39 are machined in the outer periphery 54 of the plug 29 so as to lie between the grooves 37 and 41 and the bores 50 and 51. It will be seen that the grooves 38 and 39 are of greater depth than the grooves 37 and 41. This permits the pair of annular O-rings 34 and 35 positioned therein to maintain sealing contact with the bore 31 despite lateral or sideways movement of the plug 29. The O-rings 34 and 35 are intended to retain any fluid which may have leaked out of the bores 50 and 51 into the bore 31 and they perform only a sealing function, as opposed to the function of the O-rings 33 and 36 in centering the plug 29 in the chamber 31. It will be seen that the bottoms of the grooves 37 and 41 engage O-rings 33 and 36 to apply a slight radial compressive force to said O-rings 33 and 36 and thus positively locate the plug 29 with respect to bore 31.

A pair of insulating ceramic pistons 42 and 43 are fitted into the bores 51 and 50, respectively, and engage the plug 29 on opposite sides thereof and generally midway between the O-rings 33 and 36. The piston 42 carries an O-ring seal 44 which is prevented from moving off the piston 42 by a shoulder 45 at one end of the bore 51. The piston 43 carries an O-ring seal 46 which is prevented from moving off the piston 43 by a spacer spring 47 and flat metal washer 48. The spring applies no load to the piston 43.

A mounting hole 49 permits the housing 11 to be attached and electrically grounded to a vehicle. A current-bearing wire 55 is conductively secured to the plug 29. By this arrangement a warning means such as a light bulb 56 is activated when the plug 29 is forced to contact the wall of the bore 31 by one of the pistons 42 or 43 when the other one of such pistons is not motivated by fluid pressure.

The O-rings 36 and 33 are designed to hold the plug 29 out of contact with the wall of the bore 31 despite slight differences in the pressures existing in the front and rear brake systems. For example, the master cylinder 14 may be designed to create a 20 to 30 p.s.i. differential between the front and rear brakes 19 and 17, respectively, at a given stage in the application of the brakes. Accordingly, the O-rings 33 and 36 are designed to prevent the plug from contacting the wall of the bore 31 until the differential pressures existing in the bores 50 and 51 are greater than 30 p.s.i.

Should a pressure loss be experienced in both the front and rear brake systems, the driver of the vehicle will have no difficulty determining such fact when the brakes are applied, as the brakes will be totally inoperative. The present invention is, however, designed to indicate a loss of pressure in only one of such systems where such a condition may not be readily apparent upon the application of the brakes. The device of the present invention provides a switch for activating an electrically operated warning device which may be conveniently mounted on the dashboard of the vehicle for warning the operator of the occurrence of such a brake loss condition. This is accomplished by the structure enclosed in the housing 11 in an inexpensive and reliable manner. The washers 32 and the O-rings 33, 36, 34 and 35 all have insulating properties and thus prevent the transmission of electric current from plug 29 to the housing 11 under normal conditions, and a circuit through the warning device or light bulb 56 will only be completed when a differential pressure condition exists between the front and rear brake systems of a predetermined minimum amount. This amount is established by the dimensioning of the O-rings 33 and 36, the character of the material used for said O-rings and the dimension of the clearance space between the plug 29 to the wall of the chamber 31 as compared to the size of the pistons 42 and 43.

While the embodiment of the invention illustrated here is well calculated to fulfill the objects above stated, it will be apparent the invention is susceptible of modification, variation or change without departing from the fair meaning and scope of the subjoined claims.

What is claimed is:

1. In a pressure sensitive switch for a dual brake system, a housing having first and second bores, a pair of pressure responsive members disposed within said bores and separately responsive to the pressures in said bores, a chamber in said housing between said members, an electrically conductive plug disposed in said chamber, a pair of elastomeric rings supporting said plug in said chamber normally out of electric contact with said housing and yieldable to permit said plug to shift laterally and contact said housing in response to differential pressure in said bores, and an electrical warning circuit including said plug and said housing for indicating a loss of pressure in one of said bores.

2. A pressure-sensitive switch as recited in claim 1, wherein said resilient means withhold said plug out of contact with the surface of the chamber until a predetermined differential pressure exists between said bores.

3. A pressure-sensitive switch as recited in claim 1, including a second pair of elastomeric rings in slots in said plug engaging the wall of said chamber to prevent the passage of fluid thereby from said bores.

4. A pressure-sensitive switch as recited in claim 1, wherein said plug, member, chamber, bores and pistons are of substantially cylindrical shape.

5. A pressure-sensitive switch as recited in claim 4, wherein said annular rings are of circular cross section.

6. A pressure-sensitive switch as recited in claim 4, wherein said pressure-responsive means comprising a pair of pistons made of rigid non-conductive material, one side of each piston being exposed to the fluid in one of said bores and the other side of each piston engaging diametrically opposite sides of said plug.

7. A pressure-sensitive switch as recited in claim 4, including a second pair of elastomeric rings sealing between said plug and the wall of said chamber to retain fluid in said housing that has leaked past said members from said bores.

References Cited

UNITED STATES PATENTS

| | | | |
|---|---|---|---|
| 2,764,176 | 9/1956 | Darquier | 303—84 |
| 3,228,194 | 1/1966 | Blair | 303—84 |
| 3,336,451 | 8/1967 | Burton | 200—82 |

BERNARD A. GILHEANY, *Primary Examiner.*

H. BROOME, *Assistant Examiner.*